C. Y. CLAWSON.
MILK BOTTLE AND THE LIKE.
APPLICATION FILED APR. 29, 1915. RENEWED JUNE 13, 1918.
1,291,412.
Patented Jan. 14, 1919.
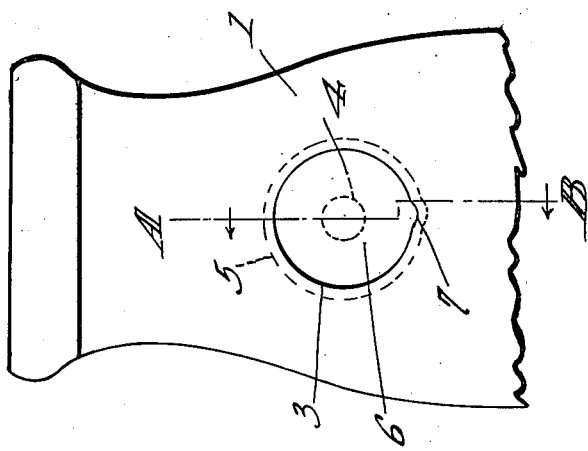
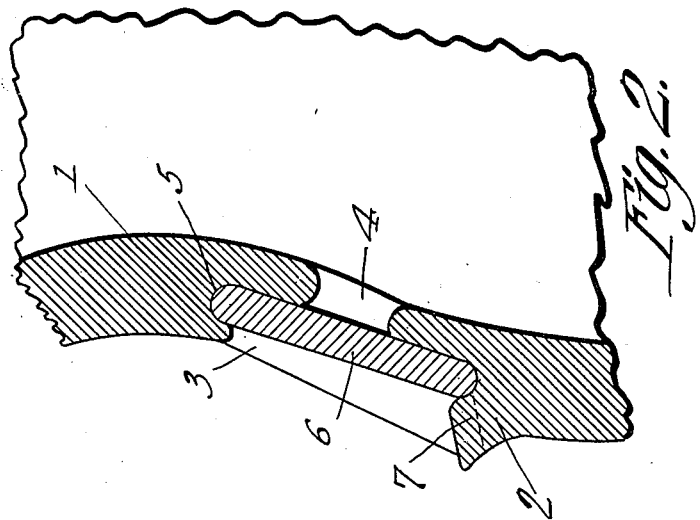
Witnesses
C. Y. Clawson
Inventor
by
Attorneys

UNITED STATES PATENT OFFICE.

CHESTER Y. CLAWSON, OF SALT LAKE CITY, UTAH.

MILK-BOTTLE AND THE LIKE.

1,291,412. Specification of Letters Patent. Patented Jan. 14, 1919.

Application filed April 29, 1915, Serial No. 24,776. Renewed June 13, 1918. Serial No. 239,889.

*To all whom it may concern:*

Be it known that I, CHESTER Y. CLAWSON, a citizen of the United States, residing at Salt Lake City, in the county of Salt Lake and State of Utah, have invented a new and useful Milk-Bottle and the like, of which the following is a specification.

This invention relates to milk bottles and the like and more particularly to a bottle having means whereby the upper portion of the liquid contents of the bottle can be drawn off without disturbing the lower portion thereof, thus permitting the removal of cream which may accumulate within the upper portion of the bottle.

Another object is to provide a structure of this character which can be readily manufactured and which has simple and efficient means for sealing the bottle to prevent the accidental escape of liquid from the bottle.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is an elevation of the upper portion of a milk bottle and showing the present improvements combined therewith.

Fig. 2 is an enlarged section on line A—B Fig. 1.

Referring to the figures by characters of reference 1 designates a portion of a milk bottle or jar having the usual means for closing the upper end thereof. The wall of the bottle is thickened, near the base of the neck thereof, as shown at 2 and formed within this thickened portion is a circular recess 3 having a concentric opening 4 in the inner wall thereof, through which liquid is free to escape from the interior of the bottle. The wall of the recess 3 has a groove 5 adapted to receive the marginal portion of a cardboard disk or cap 6 such as commonly used for closing the top of a bottle. The bottom portion of the wall of recess 3 is extended outwardly to form a lip or spout 7 so that, when the cap 6 is removed, the liquid escaping through the opening 4 will be directed outwardly in a stream from the lip 7 and into a receptacle placed against the side of the bottle 1.

It will be seen that the entire device can be manufactured as cheaply as an ordinary bottle, and in using the bottle it is only necessary to employ two caps instead of one as heretofore, one cap being used to close the top of the bottle, and the other being used to close the opening 4. When the bottle is full of milk, the cream rises to the top and, when it is desired to remove this cream without disturbing the remainder of the contents, cap 6 is removed from recess 3 so that liquid above opening 4 will gravitate through said opening as heretofore pointed out.

What is claimed is:—

A bottle having a circular recess in the outer face of the wall thereof, the bottom wall of the recess being thickened to provide an outwardly projecting pouring lip, there being a continuous groove within the wall of the recess and the bottom portion of which drains into said lip, said groove constituting a seat for the peripheral portion of a disk closure, there being a relatively small aperture extending through the wall of the bottle at the center of the recess and adapted to be closed by the disk, the inner wall of the recess presenting an extensive bearing surface for the disk closure.

In testimony that I claim the foregoing as my own, I have hereto affixed my signature in the presence of two witnesses.

CHESTER Y. CLAWSON.

Witnesses:
SHIRLEY Y. CLAWSON,
DAN MUIR.